United States Patent
Park et al.

(10) Patent No.: US 12,020,478 B1
(45) Date of Patent: Jun. 25, 2024

(54) THERMAL IMAGE-BASED HYBRID OBJECT DETECTION METHOD USING YOLO MODEL AND OBJECT TRACKING TECHNIQUE

(71) Applicant: INTER X Co., Ltd., Ulsan (KR)

(72) Inventors: Jung Ywn Park, Ulsan (KR); Ha Il Jung, Ulsan (KR); Jeong Hyun Park, Ulsan (KR)

(73) Assignee: INTER X Co., Ltd., Ulsan (KR)

(*) Notice: Subject to any disclaimer, the term of this patent is extended or adjusted under 35 U.S.C. 154(b) by 0 days.

(21) Appl. No.: 18/488,760

(22) Filed: Oct. 17, 2023

(30) Foreign Application Priority Data

Dec. 8, 2022 (KR) .......................... 10-2022-0170657

(51) Int. Cl.
*G06T 7/246* (2017.01)
*G06V 10/22* (2022.01)
*G06V 10/32* (2022.01)
*G06V 10/77* (2022.01)
*G06V 10/82* (2022.01)
*G06V 10/94* (2022.01)
*G06V 20/50* (2022.01)

(52) U.S. Cl.
CPC ............ *G06V 10/955* (2022.01); *G06T 7/248* (2017.01); *G06V 10/22* (2022.01); *G06V 10/32* (2022.01); *G06V 10/7715* (2022.01); *G06V 10/82* (2022.01); *G06V 20/50* (2022.01); *G06T 2207/10048* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 2021/0266437 A1* | 8/2021 | Wexler | G10L 15/22 |
| 2021/0287014 A1* | 9/2021 | Colachis | G06V 20/64 |
| 2023/0316545 A1* | 10/2023 | Liu | G06V 20/48 |
| | | | 382/103 |

FOREIGN PATENT DOCUMENTS

| | | |
|---|---|---|
| KR | 10-2269750 B1 | 6/2021 |
| KR | 10-2338995 B1 | 12/2021 |
| KR | 10-2341471 B1 | 12/2021 |

OTHER PUBLICATIONS

E. Maltezos, L. Karagiannidis, T. Douklias, A. Dadoukis, A. Amditis and E. Sdongos, "Preliminary design of a multipurpose UAV situational awareness platform based on novel computer vision and machine learning techniques," 2020 5th South-East Europe Design Automation, (SEEDA-CECNSM), Corfu, Greece, 2020 (Year: 2020).*

* cited by examiner

*Primary Examiner* — Idowu O Osifade
(74) *Attorney, Agent, or Firm* — Bridgeway IP Law Group, PLLC; Jihun Kim (57) ABSTRACT

A thermal image-based hybrid object detection method using a YOLO model and an object tracking technique includes: a) a step of obtaining a plurality of thermal image data by means of a thermal image camera; b) a step of extracting an object region from a thermal image data of the thermal image camera using an installed YOLO model and then creating an object region coordinate data by returning coordinates of the object region by means of an image processor; and c) a step of outputting a first image reflecting an object region coordinate data to each of thermal image data received from the image processor by means of an output device when the output device requests transmission of the first image.

4 Claims, 6 Drawing Sheets

THERMAL IMAGE-BASED HYBRID OBJECT DETECTION METHOD USING YOLO MODEL AND OBJECT TRACKING TECHNIQUE

CROSS REFERENCE TO RELATED APPLICATION

The present application claims priority to Korean Patent Applications No. 10-2022-0170657, filed Dec. 8, 2022 the entire contents of which are incorporated herein for all purposes by this reference.

BACKGROUND

Technical Field

The present disclosure relates to a thermal image-based hybrid object detection method using a YOLO model and an object tracking technique.

Description of the Related Art

Recently, as object detection is used for autonomous vehicles, etc., not only accuracy, but speed become important, and the amount of operation is large, so a high-performance GPU is required.

An R-CNN-series model, which is one of deep learning object detection models, is applied to the field of object detection by securing object detection accuracy over a predetermined level, but separately performs localization (region proposal) and classification, so it has a problem that the object detection speed remarkably decreases and accordingly it is not easy to detect an object in real time.

CNN-series models have been developed to solve the problem of the R-CNN-series model and a YOLO model is representative of such CNN-series models.

A YOLO model, which is a deep neural network designed to perform object detection, is a one-state detector that performs bounding box coordinate and classification at a time through the same neural network structure.

Such a YOLO model has the advantage of easily detecting an object in real time in that it has a structure performing object detection at a time without localization, unlike R-CNN-series models, and a high-performance GPU is used for object detection.

However, the YOLO model has a problem that it can detect an object only when operating under a high-performance GPU, and most deep learning libraries (e.g., Pytorch, Tensorflow, mxnet, etc.) are based on Python, so it is greatly insufficient to be used in C #. Further, there is a problem that since the YOLO model uses Python, even though the YOLO model is distributed, it is difficult to be distribute the YOLO model in the form of an installation program (e.g., *.msi, *.dmg, etc.).

PRIOR ART DOCUMENT

Patent Document

Korean Patent No. 10-2338995 (registered 2021.12.09)
Korean Patent No. 10-2269750 (registered 2021.06.22)

SUMMARY

Accordingly, the present disclosure has been made in an effort to solve the problems of object detection methods that can be implemented under only a high-performance GPU in the related art, and an objective of the present disclosure is to provide a thermal image-based hybrid object detection method using a YOLO model and an object tracking technique, the method having the advantage that it is possible to detect an object even without using a high-performance GPU by extracting an object region through a YOLO model-based image processor and performing object detection through a CPU-based object detector equipped with an object detection model.

Another objective of the present disclosure is to provide a thermal image-based hybrid object detection method using a YOLO model and an object tracking technique, the method performing object detection on the basis of a thermal image data obtained from a thermal image camera to reduce the operation amount of a CPU of an object detector and improve an object detection speed of the object detector.

The technical subjects to implement in the present disclosure are not limited to the technical problems described above and other technical subjects that are not stated herein will be clearly understood by those skilled in the art from the following specifications.

In order to achieve the objectives of the present disclosure, a thermal image-based hybrid object detection method using a YOLO model and an object tracking technique according to an embodiment of the present disclosure includes: a) a step of obtaining a plurality of thermal image data by means of a thermal image camera; b) a step of extracting an object region from a thermal image data of the thermal image camera using an installed YOLO model and then creating an object region coordinate data by returning coordinates of the object region by means of an image processor; c) a step of outputting a first image reflecting an object region coordinate data to each of thermal image data received from the image processor by means of an output device when the output device requests transmission of the first image; d) a step of creating an object region coordinate data by tracking multiple object regions from thermal image data of the thermal image camera using object region data including information about coordinates of the object region input from the image processor on the basis of an installed AI model, and then by returning coordinates of the object regions by means of a CPU-based object detector; and e) a step of outputting a second image, in which an object region is shown on the basis of the object region coordinate data, by applying the object region coordinate data to each of thermal image data received from the object detector by means of the output device.

According to the present disclosure, since object detection accompanying object tracking is performed in a CPU-based object detector equipped with an object detection model, there is no need for a high-performance CPU in an object detection process, so convenience can be improved.

Further, according to the present disclosure, since object detection is performed on the basis of a thermal image data obtained by a thermal image camera, the operation amount of a CPU of the object detector can be reduced and the object detection speed can be improved in the object detection process.

However, the effects of the present disclosure are not limited to the effects described above and other effects can be clearly understood by those skilled in the art from the following description.

BRIEF DESCRIPTION OF THE DRAWINGS

The above and other objectives, features and other advantages of the present disclosure will be more clearly understood from the following detailed description when taken in conjunction with the accompanying drawings, in which:

FIGS. 2A-2C are diagrams showing the process of a method of training an AI model according to an embodiment of the present disclosure, where

DETAILED DESCRIPTION

The present disclosure will be described in detail through embodiments with reference to the accompanying drawings such that those skilled in the art can easily implement the present disclosure. The description in the present disclosure is only embodiments for structural and functional description, so the scope of a right of the present disclosure should not be construed as being limited by the embodiments described herein. That is, embodiments may be changed and modified in various ways, so the scope of a right of the present disclosure should be understood as including equivalents that can achieve the spirit of the present disclosure. Further, the objects or effects proposed herein do not mean that the objects or effects should be all included in a specific embodiment or only the effects should be included in a specific embodiment, so the scope of a right of the present disclosure should not be construed as being limited by the objects or effects.

Terms used in the present disclosure should be understood as follows.

Terms "first", "second", etc. are provided for discriminating one component from another component and the scope of a right is not limited to the terms. For example, the first component may be named the second component, and vice versa. It is to be understood that when one element is referred to as being "connected to" another element, it may be connected directly to another element or be connected to another element, having the other element intervening therebetween. On the other hand, it is to be understood that when one element is referred to as being "connected directly to" another element, it may be connected to or coupled to another element without the other element intervening therebetween. Meanwhile, the terms used herein to describe a relationship between elements, that is, "between", "directly between", "adjacent" or "directly adjacent" should be interpreted in the same manner as those described above.

Singular forms should be understood as including plural forms unless the context clearly indicates otherwise and it will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms used herein have the same meaning as commonly understood by those skilled in the art to which the present disclosure belongs. It will be further understood that terms defined in dictionaries that are commonly used should be interpreted as having meanings that are consistent with their meanings in the context of the relevant art and will not be interpreted in an idealized or overly formal sense unless expressly so defined herein.

Hybrid Object Detection System

Hereafter, a hybrid object detection system 10 according to an embodiment of the present disclosure is described in detail under the assumption that objects are detected from thermal image data of a work site including a dangerous area.

Figure 1:
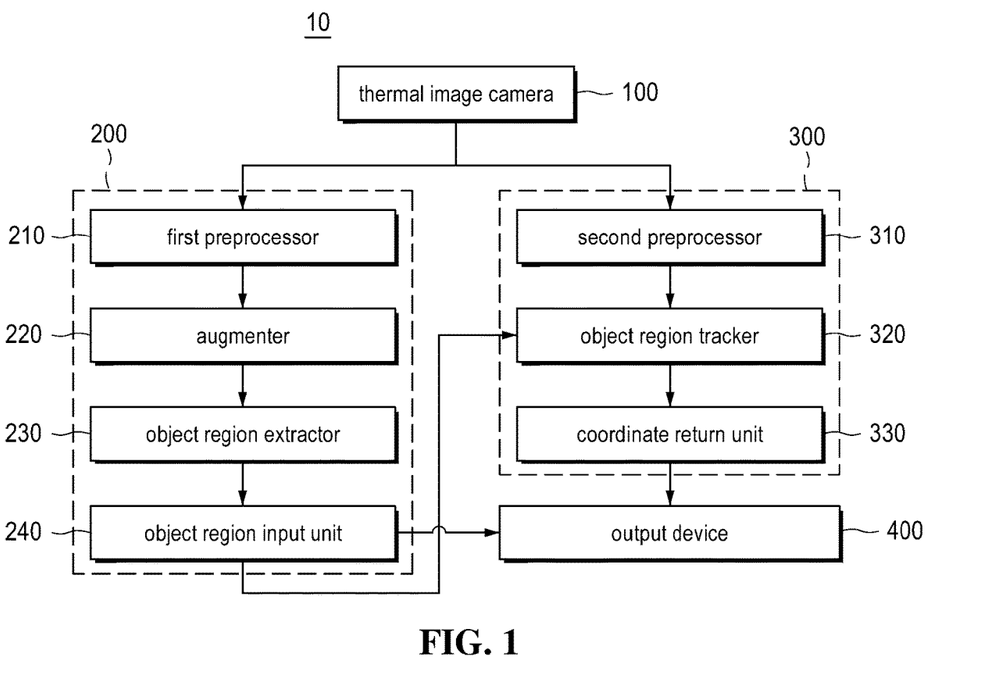
FIG. 1 is a diagram showing a hybrid object detection system according to an embodiment of the present disclosure.

FIG. 1 is a diagram showing a hybrid object detection system according to an embodiment of the present disclosure.

Referring to FIG. 1, a hybrid object detection system 10 according to an embodiment of the present disclosure includes a thermal image camera 100, an image processor 200, an object detector 300, and an output device 400.

The thermal image camera 100 is installed at a work site including a dangerous area set by a user and creates a thermal image data by sensing infrared emitted from surrounding things including objects that are humans around the work site and returning temperature sensors into images.

In an embodiment, the thermal image camera 100 can measure and monitor whether heat is emitted and an inside state that are difficult to visually check for the features of infrared in various fields such as products, processes, and facilities, and can accurately measure temperature within the range of $-80 \sim 3000°$ C. with a temperature difference of up to $0.02°$ C.

In an embodiment, it is preferable that the thermal image camera 100 obtains in real time a thermal image data of the surrounding of a work site taken for 24 hours while operating 24 hours.

In an embodiment, the thermal image camera 100 can obtain a thermal image data composed of 10 still images (frames) for 1 second by imaging a work site with frames per second (FPS) set as 10.

In an embodiment, the thermal image camera 100 modularizes and classifies the obtained 10 (hereafter, a plurality of) thermal image data into one module data, transmits at least one thermal image data of a plurality of thermal image data, which are module data, to the image processor 200 such that object regions are extracted by the image processor 200, and transmits the other thermal image data to the object detector 300 except for the thermal image data transmitted to the image processor 200 such that the object detector 300 can track objects.

In an embodiment, it is preferable that the thermal image camera 100 is equipped with an image processing algorithm, which has been trained and examined, to be able to automatically create a module data and transmit a plurality of thermal image data to the image processor 200 and the object detector 300 every time it obtains a plurality of thermal image data by imaging a work site.

The image processor 200 includes a first preprocessor 210, an augmenter 220, an object region extractor 230, and an object region input unit 240.

The first preprocessor 210 receives a plurality of thermal image data obtained by the thermal image camera 100 imaging the surrounding of a work site through communication with the thermal image camera 100 in a wired/wireless type, and can adjust the size of each of thermal image data through resizing and/or cropping so that the received thermal image data can be applied to an AI model of the object region extractor 230.

In an embodiment, it is preferable that the first preprocessor 210 is equipped with a preprocessing algorithm for resizing and cropping thermal image data in the state in which training and examining are finished to perform preprocessing on thermal image data.

The augmenter 220 receives a preprocessed thermal image data from the first preprocessor 210 by communicating with the first preprocessor 210 in a wired/wireless type and augments one preprocessed thermal image data into a plurality of thermal image data by performing shade adjustment and regularization on the received preprocessed thermal image data.

In an embodiment, it is preferable that the augmenter 220 is equipped with an augment algorithm for performing shade adjustment and regularization on thermal image data in the state in which training and examining are finished.

In an embodiment, the augmenter 220 can augment one preprocessed thermal image data into a first thermal image data, a second thermal image data, and a third thermal image data, which are different in brightness, by performing shade adjustment and regularization on a preprocessed thermal image data.

In an embodiment, the first thermal image data may be a thermal image data brighter than the second and third thermal image data, the second thermal image data may be a thermal image data brighter than the third thermal image data, and the third thermal image data may be a thermal image data darker than the first and second thermal image data.

In an embodiment, the augmenter 220 sets brightness as one parameter and can augment a thermal image data preprocessed through cropping and rotating into first, second, and third thermal image data.

Meanwhile, temperature always changes due to various external factors such as seasons and hours and a thermal image of an object also changes with variation of temperature for the features of a thermal image camera, so when a thermal image taken at a specific point in time is augmented through a common method, the brightness is not changed, so it can be learned slantly at a specific temperature. Accordingly, the augmenter 220 sets brightness as one parameter.

The object region extractor 230 receives augmented thermal image data from the augmenter 220 by communicating with the augmenter 220 in a wired/wireless type, adjusts the size of a plurality of augmented thermal image data into the size when a thermal image data is obtained from the thermal image camera 100 through an AI model that has been examined after training, and then extracts one or more object regions from the plurality of augmented thermal image data.

In an embodiment, a YOLOv5 model may be applied as the AI model installed in the object region extractor 230.

Herein, the YOLOv5 model is an image processing algorithm that can be used for a real-time object detection algorithm that processes images through a Backbone-Neck-Head step. Since such a YOLOv5 model is an algorithm that is generally used in the field of image processing, it is not described in detail for the convenience of description.

In an embodiment, the object region extractor 230 is not limited to the configuration equipped with the YOLOv5 model and YOLO models of other versions may be applied. Accordingly, it is assumed in the following description that the AI model of the object region extractor 230 is a YOLO model.

In an embodiment, a YOLO model may be installed in the object region extractor 230 through learning and examining processes through a training data and an examining data classified from the thermal image camera 100.

In an embodiment, the training data and the examining data for the YOLO model may be thermal image data and the object region extractor 230 can classify a thermal image data into a training data and an examining data.

In an embodiment, in the object region extractor 230, the installed YOLO model extracts, refines, and reconfigures a feature map from a thermal image data through a Backbone-Neck-Head step, localizes the extracted feature map, estimates a class and an object region, and then creates feature maps of three sizes (e.g., a first size (18×18), a second size (36×36), and a third size (72×72)) for multi-scale estimation, thereby processing an object.

In an embodiment, the object region extractor 230, after processing the object, adjusts the size of a plurality of augmented thermal image data into the size when a thermal image data is obtained from the thermal image camera 100, and then extracts an object region from each of the plurality of augmented thermal image data.

The object region input unit 240 receives a plurality of thermal image data, of which the object regions have been extracted, from the object region extractor 230 by communicating with the object region extractor 230 in a wired/wireless type, adjusts the coordinates of the object regions configured in the plurality of thermal image data with the object regions extracted on the basis of the thermal image data adjusted into the size when it is obtained from the thermal image camera 100, and then returns the coordinates, thereby creating an object region coordinate data.

In an embodiment, the object region input unit 240, the same as the object region extractor 230, is equipped with a YOLO model that has been trained and examined, thereby being able to create an object region coordinate data after returning the coordinates of an object region through the YOLO model.

In an embodiment, when the output device 400 requests transmission of a first image after the object region is returned, the object region input unit 240 transmits the thermal image data and the object region coordinate data to the output device 400 such that the first image is output from the output device 400.

In an embodiment, the first image may be an image in which an object region is shown at object region coordinates by applying the object coordinate data to the thermal image data received from the object region input unit 240 by means of the output device 400.

That is, the first image may be an image in which an object region based on coordinates returned through object extraction by extraction of an object region performed by the image processor 200 is shown.

In an embodiment, when coordinate return of an object region is finished, the object region input unit 240 can input an object region data including information about the coordinates of the object region to the object region extractor 230 of the object detector 300 so that the object detector 300 is enabled to perform multi-object tracking through a multi-object tracking technique and can tract an object detected by the YOLO model of the object region extractor 230.

The object detector 300, which is a CPU-based device, includes a second preprocessor 310, an object region tracker 320, and a coordinate return unit 330 to detect objects from a thermal image data on the basis of an object region data input from the object region input unit 240.

The second preprocessor 310 receives the other thermal image data from the thermal image camera 100 except for the thermal image data transmitted to the first preprocessor 210, and preprocessing of a plurality of thermal image data may be omitted to minimize the operation amount of a CPU.

In an embodiment, the second preprocessor 310 can maintain the size of a thermal image data obtained from the thermal image camera 100 to minimize the operation amount of a CPU, but may adjust the size of each thermal image data by resizing and/or cropping the thermal image data.

In an embodiment, it is preferable that the second preprocessor 310 may be equipped with a preprocessing algorithm for resizing and cropping a thermal image data in the state in which training and examining are finished in order to be able to adjust the size of a thermal image data in accordance with a request from a user.

The object region tracker 320 receives a thermal image data from the second preprocessor 310 by communicating with the second preprocessor 310 and the object region input unit 240 and an object region data is input by the object region input unit 240.

In an embodiment, the object region tracker 320 can track multiple object regions from a thermal image data.

In an embodiment, tracking multiple object regions by the object region tracker 320 means tracking at least one or more object regions surrounding the positions of objects in a rectangular shape in a thermal image data.

In an embodiment, the object region tracker 320 is equipped with an AI model, which have been trained and examined, to track multiple object regions and a Channel and Spatial Reliability (CSRT) model may be applied as the AI model.

In this configuration, the CSRT model is an algorithm that can be provided in an Open Source Computer Vision (Open CV) in which when an object to be tracked is determined, an application programming interface (API) automatically tracks the object. Since such a CSRT model is an algorithm that is generally used in the field of object tracking, it is not described in detail for the convenience of description.

In an embodiment, the object region tracker 320 is not limited to the configuration equipped with a CSRT model, and a Boosting model and a Tracking, Learning and Detection (TLD) model that can be used in the field of object tracking may be applied, but preferably, the object region tracker 320 can be equipped with a CSRT model, and accordingly, it is assumed in the following description that the AI model of the object region tracker 320 is a CSRT model.

In an embodiment, the CSRT model installed in the object region tracker 320 tracks an object region from a thermal image data through three-step operation of space reliability map construction, limited correlation filter training, and channel reliability estimation in the way of mapping a weight of a detected object.

The coordinate return unit 330 receives a thermal image data with a tracked object from the object region tracker 320 by communicating with the object region tracker 320 in a wired/wireless type, and returns the coordinates of the object region in the thermal image data with the tracked object.

In an embodiment, the coordinate return unit 330, the same as the object region tracker 320, is equipped with a CSRT model that has been trained and examined and can create an object region coordinate data by returning the coordinates of an object region on the basis of the CSRT model.

In an embodiment, when finishing returning the coordinates of the object region, the coordinate return unit 330 transmits the returned object region coordinate data to the output device 400.

The output device 400 receives object region coordinate data from the coordinate return unit 330 while receiving a thermal image data, which is received from the second preprocessor 310, by communicating with the second preprocessor 310 and the coordinate return unit 330 in a wired/wireless type.

In an embodiment, the output device 400 outputs a second image in which an object region is shown on the basis of an object region coordinate data created by applying an object region coordinate data of the coordinate return unit 330 to the thermal image data of the second preprocessor 310.

That is, the second image may be an image in which an object region based on coordinates returned through object tracking by tracking of an object region performed by the object detector 300 is shown.

In an embodiment, it is preferable that the output device 300 is a device having a display for outputting first and second images and having an input unit that can request the object region input unit 240 to transmit a first image in order to output the first image.

In an embodiment, the output device 400 may be a terminal having a display and an input unit, and the input unit for requesting transmission of a first image may be an input unit (not shown) having a button for requesting transmission of a first image or a category in a website that a terminal can access to be able to remotely communicate with a first image.

The hybrid object detection system 10 extracts an object region from a thermal image data obtained through the thermal image camera 100 using the image processor 200 having a YOLO model and performs object detection using the CPU-based object detector 300, thereby having the advantage that it is possible to detect an object even without using a high-performance CPU.

Meanwhile, since when the thermal image camera 100 images an object, the thermal image camera 100 does not need to input the taken image to the YOLO model for every frame and the YOLO model does not need to infer, the thermal image camera 100 may extract and input only a specific frame and perform inference (object detection) on the other frames. This is because the temperature of an object does not rapidly change for the features of a thermal image.

Accordingly, when the hybrid object detection system 10, in an embodiment, is configured to input a thermal image into a YOLO model for every five frames of 10 FPS and track objects in the thermal images of the four frame therebetween, the operation amount of a CPU can be reduced and simultaneously the number of thermal images to be inferred by the YOLO model is also reduced, so an object detection speed can be improved.

Further, the hybrid object detection system 10 may include a controller (not shown) to remotely control operations of the thermal image camera 100, the image processor 200, the object detector 300, and the output device 400.

In an embodiment, the controller is disposed in the output device 400, whereby it may be possible to input a control signal on a terminal that is the output device 400 or a website that a terminal accessed.

Meanwhile, it is preferable that the thermal image camera 100, the image processor 200, the object detector 300, and the output device 400 include a communication unit (not shown) to be able to communicate with the controller, and can individually operate in response to control signals received from the controller.

AI Model Training Method

Hereafter, an AI model training method S10 for training the AI model installed in the image processor 200 and the AI model installed in the object detector 300 is described in detail.

Figure 2A:
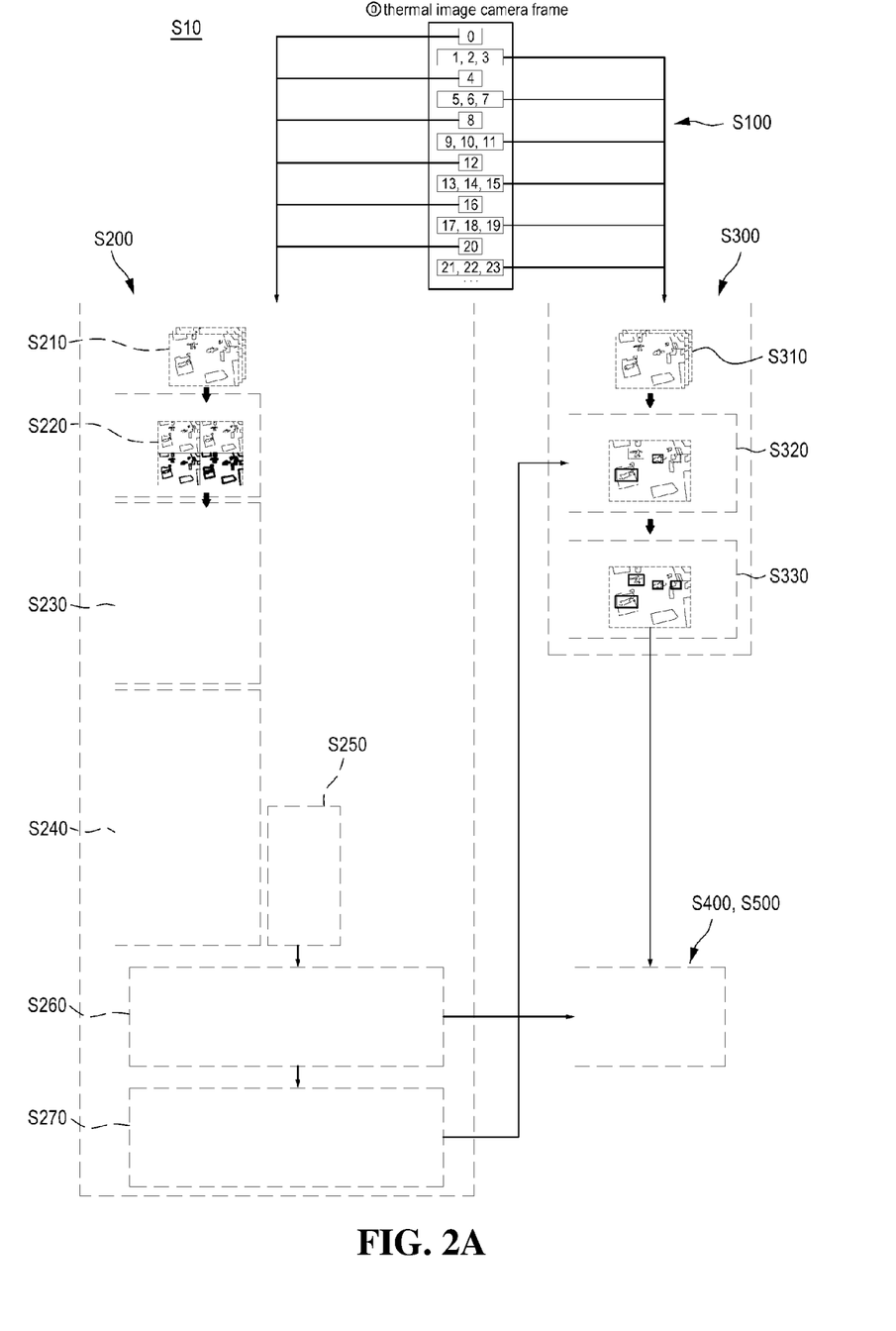
Figure 2B:
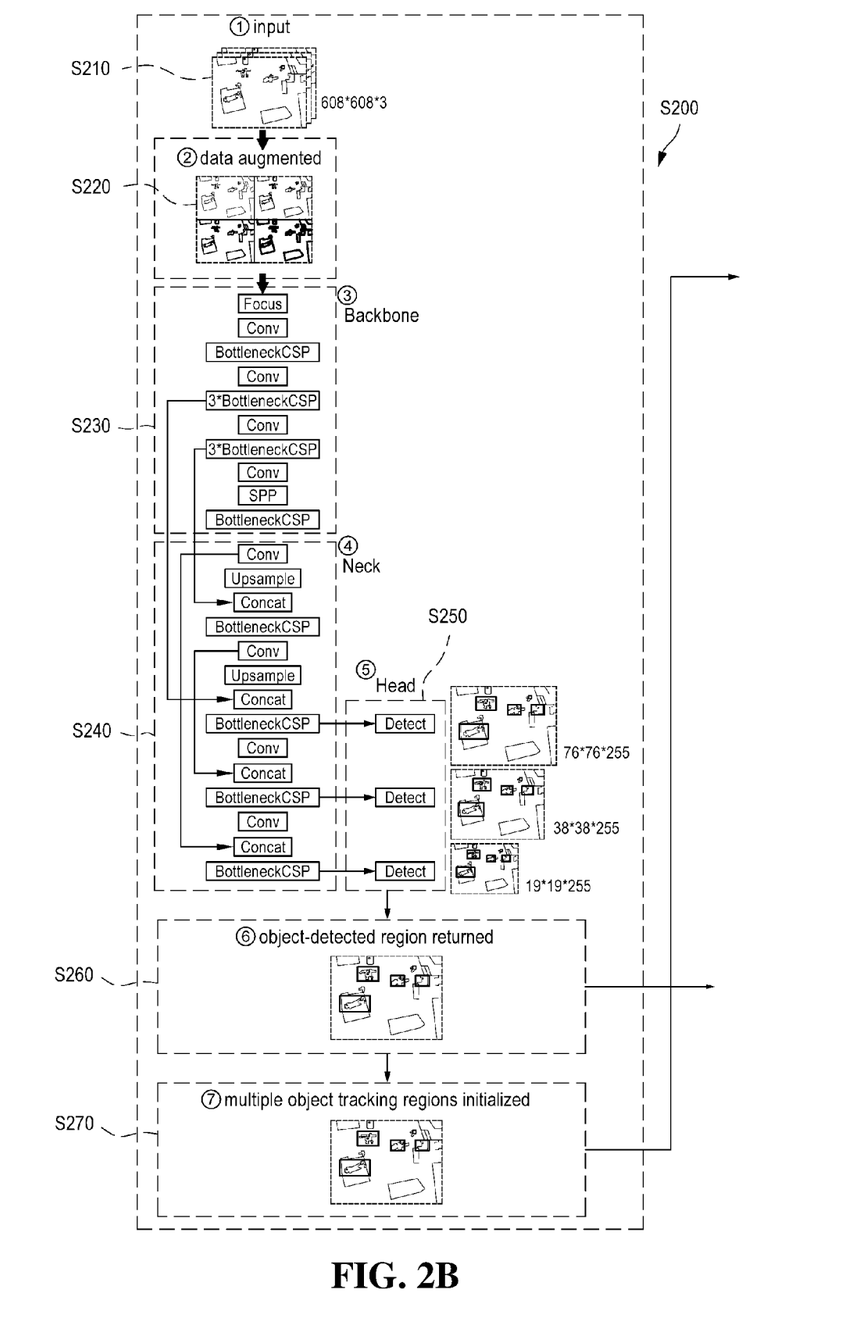
FIG. 2B illustrates a block diagram including the blocks of S210, S220, S230, S240, S250, S260 and S270 of FIG. 2A
Figure 2C:
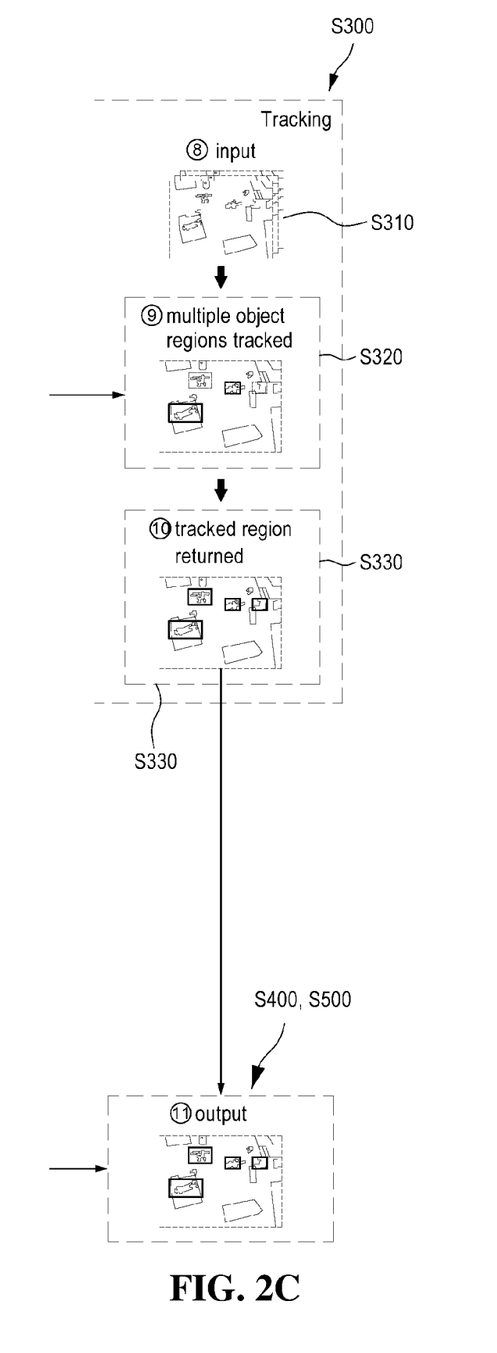
FIG. 2C illustrates a block diagram including the blocks of S310, S320, S330, S400 and S500 of FIG. 2A.

FIGS. 2A-2C are diagrams showing the process of a method of training an AI model according to an embodiment of the present disclosure.

The image processing algorithm of the thermal image camera 100 may be trained to create a module data every time a plurality of thermal image data is obtained in accordance with setting of FPS and to transmit the plurality of thermal image data to the image processor 200 and the object detector 300 (S100).

The image processor 200 may be trained to extract an object region from a thermal image data (S200).

The object region extraction step S200 may be performed in the order of a preprocessing step for training an AI model S210, an augmenting step S220, a feature map extraction step S230, a refining and reconfiguring step S240, an object region extraction step S250, an object region coordinate return step S260, and an object region data input step S270.

The preprocessing algorithm of the first preprocessor 210 may be trained to adjust the size of a thermal image data that is received from the thermal image camera 100 in the preprocessing step S210.

The augmenting algorithm of the augmenter 220 may be trained to receive a preprocessed thermal image data from the first preprocessor 210 and augment a thermal image data processed on the basis of shade adjustment and regularization into a plurality of thermal image data for training and examining a YOLO model to be installed in the object region extractor 230 in the augmenting step S220.

The YOLO model of the object region extractor 230 may be trained to extract a feature map of the thermal image data augmented by the augmenter 220 through a Backbone structure in the feature map extraction step S230.

The object region extractor 230 is equipped with a light-weighting model to prevent the features extracted from the feature map by the YOLO model in the feature map extraction step S230 from being used again and prevent inclination information from being repeatedly used, whereby it is possible to maintain accuracy in extracting a feature map and reduce an operation amount for extracting a feature map.

In an embodiment, the light-weighting model may be a model to which at least one deep learning technique of Weighted-Residual-Connections (WRC), Cross-Stage-Partial-Connections (CSP), Cross mini-Batch Normalizations (CmBN), Self-Adversarial-Training (SAT), Mish Activation, Mosaic Data Augmentation, Drop Block Regularization, and CIOU Loss is applied, but the light-weighting model is not limited thereto, and preferably, CSP-Darknet pertaining to a CSP model may be used as the light-weighting model.

Such CSP-Darknet is a common model based on a deep learning technique that is used in a Backbone structure, so it is not described in detail for the convenience of description.

Meanwhile, since the YOLO model of the object region extractor 230 is sensitive to a shape when extracting the features of the temperature, brightness, and shape of an object from a thermal image data of the thermal image camera 100 that is a 1-channel image data, as compared with when extracting the features of the color and the shape of an object from an image data of a CCTV and a vision camera that is a 3-channel image data, it may be difficult to detect an object of which the shape has not been learned, so as diverse as possible large-size thermal image datasets need to be used.

The YOLO model of the object region extractor 230 may be trained to refine and reconfigure a feature map extracted through the Backbone structure using a refinement model on a Neck structure connecting a Backbone and a head in the refining and reconfiguring step S240.

The object region extractor 230 may be equipped with a refinement model so that accuracy in extracting and detecting an object is improved when the YOLO model refines and reconfigures a feature map in the refining and reconfiguring step S240.

In an embodiment, the refinement model may be at least one of FPN, PANet, and Bi-FPN, but is not limited thereto, and preferably, PANet may be used as the refinement model.

Such PANet is a common model based on a deep learning technique that is used in a Neck structure, so it is not described in detail for the convenience of description.

The YOLO model of the object region extractor 230 may be trained to extract an object region after classifying and localizing an object 10 that is a feature extracted through the Backbone structure on a head structure in the object region extraction step S250.

In the object region extraction step S250, an AI model 145 that is the YOLO model of the object region extractor 230 creates feature maps of three kinds of predetermined sizes (e.g., a first size (18×18), a second size (36×36), and a third size (72×72)) for multi-scale prediction in this process, so the AI model 145 may be trained to be able to detect objects of the first, second, and third sizes and object regions may be extracted after their sizes are adjusted into an input size of the thermal image data.

The YOLO model of the object region input unit 240 may be trained to adjust and return the coordinates of object regions configured in a plurality of thermal image data with object regions extracted by the object region extractor 230 on the basis of a thermal image data adjusted into the size when it is obtained from the thermal image camera 100 in the object region coordinate return step S260.

The YOLO model of the object region input unit 240 may be trained to transmit a first image in response to a first image transmission request from the output device 400 in the object region coordinate return step S260, and in this case, the output device 400 outputs the first image (S400).

The YOLO model of the object region input unit 240 may be trained to input an object region data into the object region extractor 230 of the object detector 300 so that the object detector 300 can track an object detected by the YOLO model of the object region extractor 230 in the object region data input step S270.

The object detector 300 may be trained to be able to track an object from a thermal image data (S300).

The object extraction step S300 may be performed in the order of an input step S310, an object region tracking step S320, and an object region coordinate return step S330 to train a CSRT model to be loaded in each of the object region tracker 320 and the coordinate return unit 330.

The preprocessing algorithm of the second preprocessor 310 may be trained to be able to input a plurality of thermal image data, which is received from the thermal image camera 100, in the same size and adjust the size of the plurality of thermal image data that is received from the thermal image camera 100 through resizing and/or cropping in accordance with a request from a user in the input step S310.

The CSRT model of the object region tracker 320 may be trained to track multiple object regions from a plurality of thermal image data received from the second preprocessor 310 using an object region data input from the object region input unit 240 in the object region tracking step S320.

The CSRT model of the object region tracker 320 may be trained to track an object region from a thermal image data through three-step operation of space reliability map construction, limited correlation filter training, and channel reliability estimation in the way of mapping a weight of a detected object in the object region tracking step S320

The CSRT model of the coordinate return unit 330 may be trained to return the coordinates of an object region in the thermal image data with an object tracked by the object region tracker 320 in the object region coordinate return step S330.

The CSRT model of the coordinate return unit 330 may be trained to transmit the returned object region coordinate data to the output device 400 when finishing returning the coordinates of the object region in the object region coordinate return step S330.

The output device 400 can output a second image in which an object region is shown on the basis of an object region coordinate data created by applying an object region coordinate data of the coordinate return unit 330 to the thermal image data of the second preprocessor 310 (S500).

Hybrid Object Detection Method

Hereafter, the process of a hybrid object detection method S1000 that is performed by the hybrid object detection system 10 is described in detail under the assumption that objects are detected from thermal image data of a work site including a dangerous area.

Figure 3:
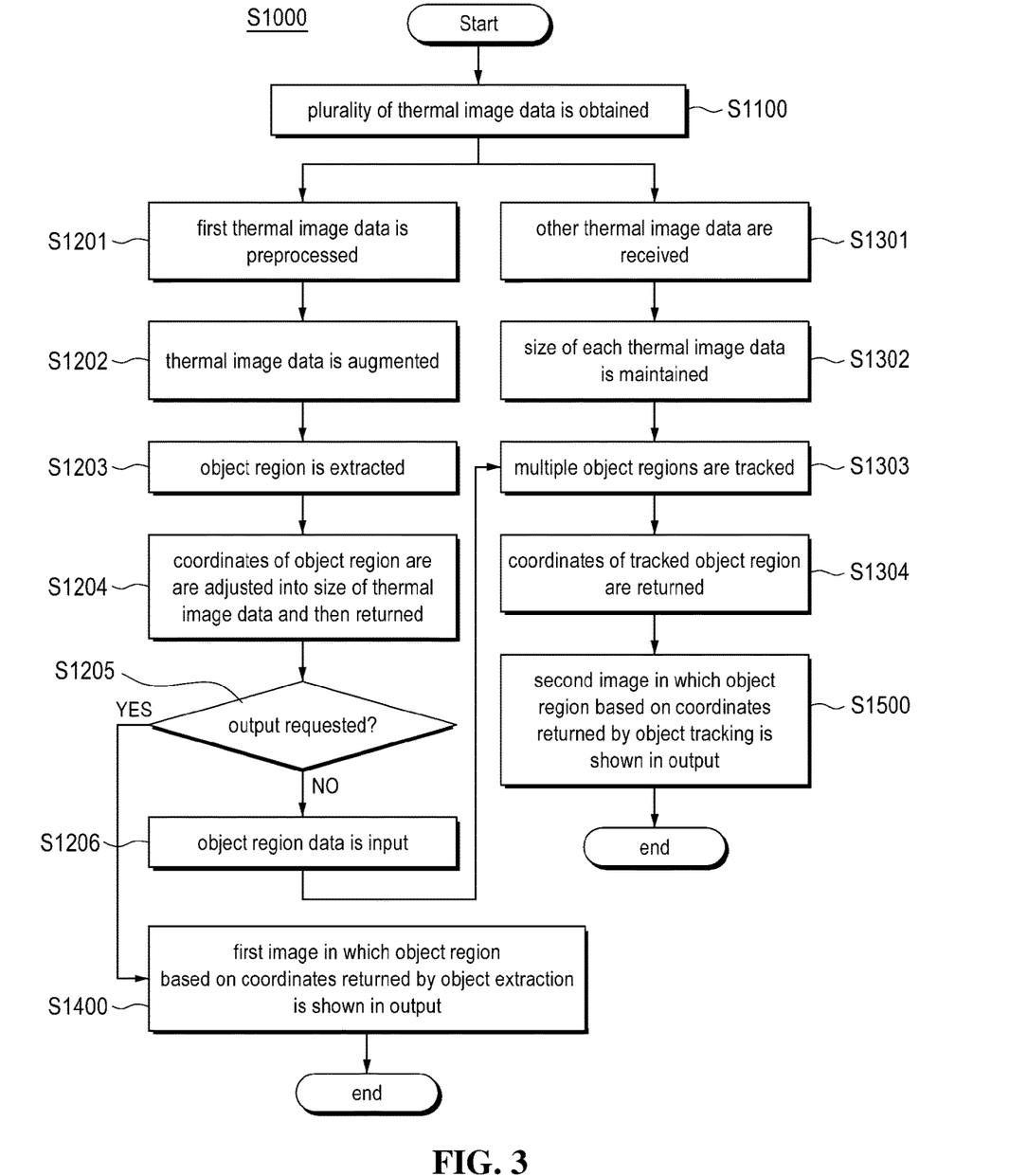
FIG. 3 is a diagram showing the process of a hybrid object detection method according to an embodiment of the present disclosure.

FIG. 3 is a diagram showing the process of a hybrid object detection method according to an embodiment of the present disclosure.

Referring to FIG. 3, the thermal image camera 100 can be installed at a work site including a dangerous area set in advance by a manger and obtain a plurality of thermal image data by imaging the work site in real time (S1100).

Thereafter, when a thermal image data received from the thermal image camera 110 is input, the first preprocessor 210 can adjust the size of the input thermal image data (S1201).

Thereafter, the augmenter 220 can augment the preprocessed thermal image data from the first preprocessor 210 into a plurality of thermal image data on the basis of shade adjustment and regularization of the preprocessed thermal image data (S1202).

Thereafter, the YOLO model installed in the object region extractor 230 can adjust the size of a plurality of augmented thermal image data into the size when a thermal image data is obtained from the thermal image camera 100, and then extract one or more object regions from the plurality of augmented thermal image data (S1203).

Thereafter, the object region input unit 240 can create an object region coordinate data by adjusting and then returning the coordinates of object regions configured in the plurality of thermal image data with object regions extracted by the object region extractor 230 on the basis of the thermal image data adjusted into the size when a thermal image data is obtained from the thermal image camera 100 (S1204).

After the object region coordinate return step S1204, the object region input unit 240 can determine whether the output device 400 requests output of a first image (S1205).

In this case, if a user requests the object region input unit 240 to output a first image through the output device 400 (S1205—YES), the object region input unit 240 transmits a thermal image data and an object region coordinate data to the output device 400 such that the output device 300 outputs a first image in which an object region based on coordinates returned through object extraction is shown (S1400).

Unlike, if a user does not request the object input unit 240 to output a first image through the output device 400 (S1205—NO) or when return of object region coordinates is finished, the object region input unit 240 can input an object region data into the object region extractor 230 (S1206).

Meanwhile, the second preprocessor 310 can receive the other thermal image data from the thermal image camera 100 except for the thermal image data transmitted to the first preprocessor 210 (S1301), and can maintain a plurality of thermal image data received from the thermal image camera 100 in the size of a thermal image data obtained by the thermal image camera 100 to minimize the operation amount of the CPU of the object detector 300 (S1302).

Thereafter, the object region tracker 320 can track multiple object regions from the thermal image data received from the second preprocessor 320 using the object region data input by the object region input unit 240 on the basis of three-step operation of space reliability map construction, limited correlation filter training, and channel reliability estimation (S1303).

Thereafter, the coordinate return unit 330 can create an object region coordinate data by returning the coordinates of object regions in the thermal image data with objects tracked by the object region tracker 320 (S1304).

After the object region coordinate return step S1304, the output device 400 can output a second image, in which an object region based on coordinates returned through object tracking by object region tracking is shown, by applying an object region coordinate data of the coordinate return unit 330 to the thermal image data of the second preprocessor 310 (S1500).

Comparative Example 1

In the comparative example 1, the speeds of processing thermal image data of the hybrid object detection system 10 and a YOLO model of the related art were compared, and the result of comparing the speeds is as the following [Table 1].

TABLE 1

| Number of images | Processing speed of YOLO (s) | Processing speed of invention (s) |
| --- | --- | --- |
| 10 | 3.2 | 1.2 |
| 50 | 16.2 | 5.3 |
| 100 | 33.7 | 10.3 |
| 200 | 65.2 | 20.1 |
| 500 | 173.9 | 52.3 |
| 1000 | 378.2 | 106.1 |

The tests of [Table 1] were performed using Intel® Core™ i7-10700K CPU and RAM 32.0 GB and it was derived from the tests that the speed of detecting objects using thermal image data of the hybrid object detection system 10 is higher than that of the YOLO model of the related art.

Figure 4:
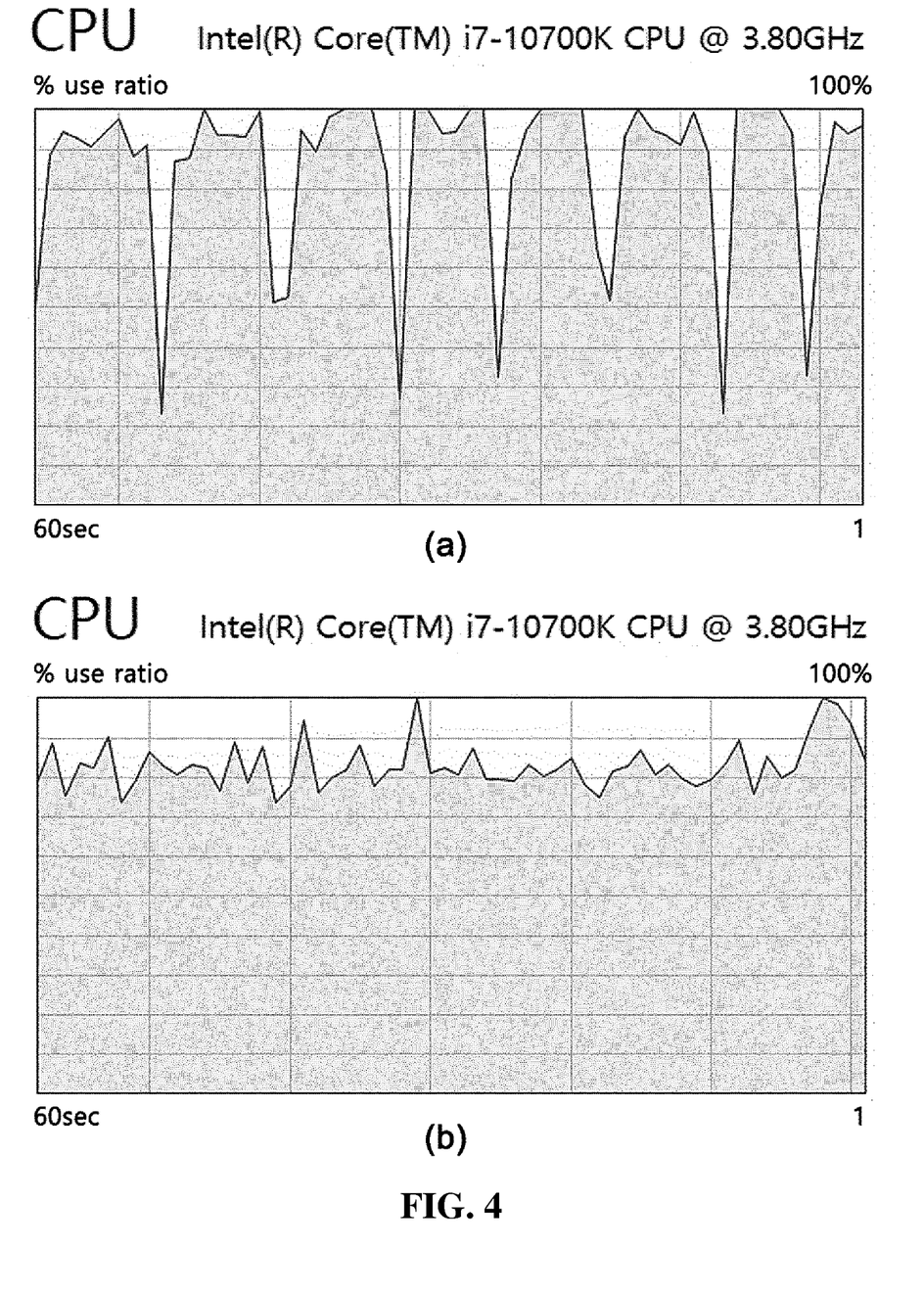
FIG. 4 is a diagram showing the result of comparing CPU use ratios of the hybrid object detection system according to an embodiment of the present disclosure and a YOLO model of the related art.

The use amounts of CPU of the hybrid object detection system 10 and the YOLO model of the related art were compared in the comparative example 1, and the result of comparing the use amount of CPU is shown in FIG. 4.

FIG. 4 is a diagram showing the result of comparing CPU use ratios of the hybrid object detection system according to an embodiment of the present disclosure and a YOLO model of the related art.

Referring to FIG. 4, it was found out that the operation amount of the CPU of the hybrid object detection system 10 decreased as the result of comparing the use amount of the CPU of the hybrid object detection system 10 and the use amount of the CPU of the YOLO model of the related art.

Description of exemplary embodiments of the present disclosure described above was provided to enable those skilled in the art to achieve and implement the present disclosure. Although the present disclosure was described above with reference to exemplary embodiments, it should be understood that the present disclosure may be changed and modified in various ways by those skilled in the art, without departing from the scope of the present disclosure. For example, those skilled in the art may combine the components described in the embodiments described above. Accordingly, the present disclosure is not limited to the embodiments described herein and is intended to provide a widest range coinciding with the principles and new features described herein.

The present disclosure may be implemented in other specific ways without departing from the spirit and necessary features. Accordingly, the detailed description should not be construed as being limited in all respects and should be construed as an example. The scope of the present disclosure should be determined by reasonable analysis of the claims and all changes within an equivalent range of the present disclosure are included in the scope of the present disclosure. The present disclosure is not limited to the embodiments described herein and is intended to provide a widest range coinciding with the principles and new features described herein. Further, an embodiment may be configured by combining claims that do not clearly cite each other in claims or the claims may be included in new claims through amendment.

What is claimed is:

1. A thermal image-based hybrid object detection method using a YOLO model and an object tracking technique, the thermal image-based hybrid object detection method comprising:
   a) using a thermal image camera, obtaining a plurality of thermal image data, wherein the plurality of thermal image data comprises a first thermal image data and a second thermal image data;
   b) using an image processor, extracting an object region from the first thermal image data of the thermal image camera with an YOLO model installed on the image processor and creating a first object region coordinate data by returning coordinates of the object region;
   c) using an output device, outputting a first image reflecting the first object region coordinate data received from the image processor when the output device requests transmission of the first image;
   d) using a CPU-based AI object detector, creating a second object region coordinate data by tracking multiple object regions from the second thermal image data of the thermal image camera using the first object region coordinate data created by the image processor and by returning coordinates of the multiple object regions; and
   e) using the output device, outputting a second image reflecting the second object region coordinate data received from the CPU-based AI object detector
   wherein the step of b) comprises:
      b-1) adjusting a size of the first thermal image data received from the thermal image camera using a first preprocessor;
      b-2) augmenting the first thermal image data preprocessed by the first preprocessor into a plurality of thermal image data through shade adjustment and regularization using an augmenter;
      b-3) adjusting a size of the plurality of thermal image data augmented through the YOLO model into a size equivalent to a size of the first thermal image data obtained by the thermal image camera and extracting one or more object regions from the plurality of augmented thermal image data using an object region extractor; and
      b-4) creating the first object region coordinate data by adjusting and returning coordinates of the one or more object regions configured in the plurality of thermal image data,
   wherein the step of b-2) comprises augmenting the preprocessed first thermal image data into at least two thermal image data of different brightness.

2. The thermal image-based hybrid object detection method of claim 1, wherein the step of d) comprises:
   d-1) maintaining a size of the second thermal image data received from the thermal image camera using a second preprocessor;
   d-2) tracking the multiple object regions from the second thermal image data received from the second preprocessor using an AI model of an object region tracker; and
   d-3) creating the second object region coordinate data by returning the coordinates of the multiple object regions from the second thermal image data tracked by the object region tracker.

3. The thermal image-based hybrid object detection method of claim 2, wherein the step of d-2) comprises tracking the multiple object regions from the second thermal image data through three-step operation of space reliability map construction, limited correlation filter training, and channel reliability estimation in a way of mapping a weight of an object using the object region tracker.

4. The thermal image-based hybrid object detection method of claim 2, wherein the AI model is at least one of a CSRT model, a Boosting model, and a TLD model for tracking the multiple object regions.

* * * * *